No. 796,968. PATENTED AUG. 8, 1905.
J. HERR.
CLAMP.
APPLICATION FILED JAN. 3, 1905.
2 SHEETS—SHEET 1.
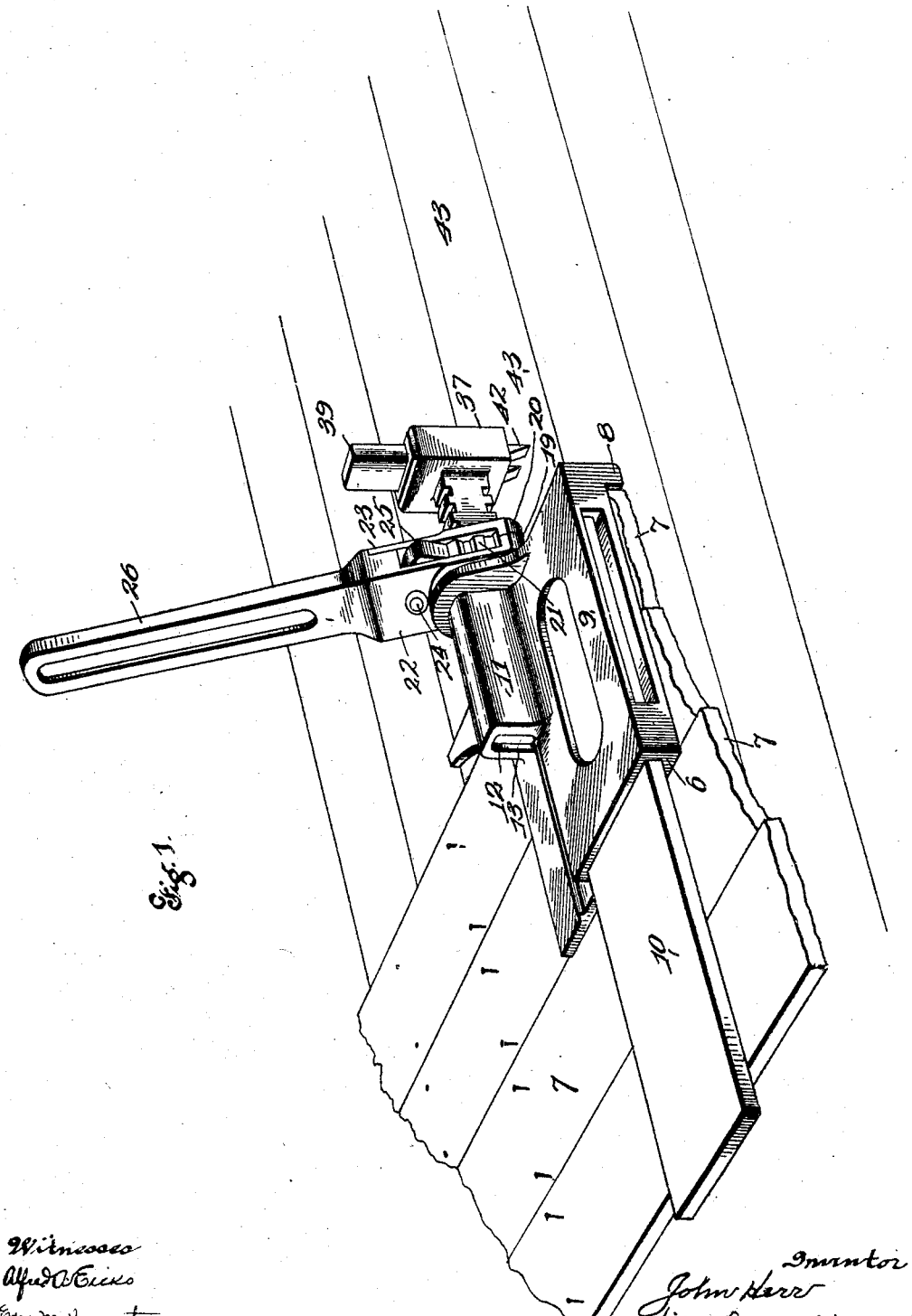

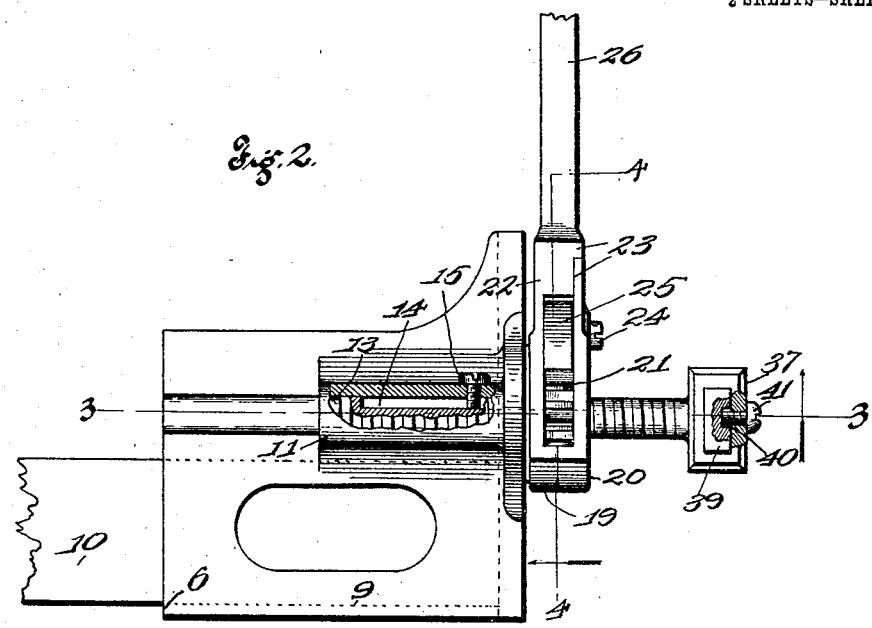
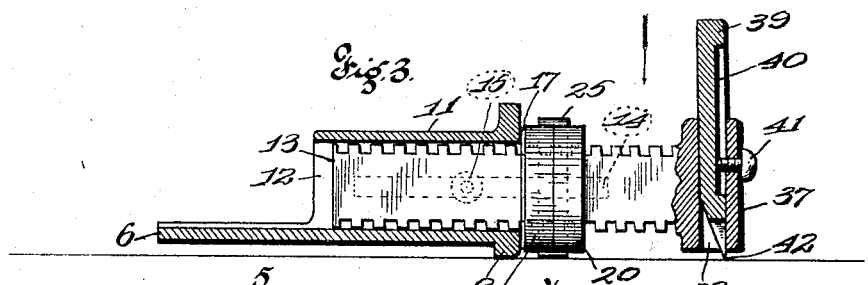
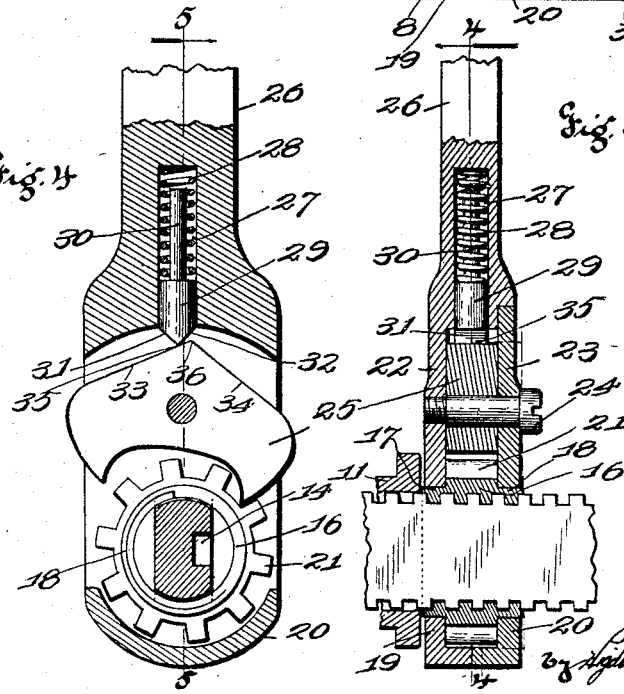

UNITED STATES PATENT OFFICE.

JOHN HERR, OF ST. LOUIS, MISSOURI.

CLAMP.

No. 796,968.  Specification of Letters Patent.  Patented Aug. 8, 1905.

Application filed January 3, 1905. Serial No. 239,511.

*To all whom it may concern:*

Be it known that I, JOHN HERR, a citizen of the United States, and a resident of St. Louis, State of Missouri, have invented certain new and useful Improvements in Clamps, of which the following is a specification containing a full, clear, and exact description, reference being had to the accompanying drawings, forming a part hereof.

My invention relates to improvements in clamps; and it consists of the novel features herein shown, described, and claimed.

In the drawings, Figure 1 is a perspective of a clamp embodying the principles of my invention and showing one operation. Fig. 2 is a top plan view of the clamp as seen looking in the direction indicated by the arrow 2 in Fig. 3, parts being shown in section to illustrate the construction. Fig. 3 is a vertical longitudinal section on the line 3 3 of Fig. 2 and looking in the direction indicated by the arrow. Fig. 4 is an enlarged cross-section on the lines 4 4 of Figs. 2 and 5. Fig. 5 is a longitudinal sectional detail on the line 5 5 of Fig. 4.

Referring to the drawings in detail, the clamp is illustrated in connection with the operation of laying flooring, and the base-plate 6 is flat upon its lower face and adapted to rest upon the upper faces of the floor-boards 7. The clamping-lip 8 extends downwardly from the inner end of the plate 6 to engage the edges of the inner floor-board 7. A housing 9 extends upwardly from the plate 6 and forms a socket or bearing to receive the end of the footboard 10, said board forming a platform upon which the operator may stand to hold the base 6 from rising. A bearing-block 11 extends upwardly from the base-plate at one side of the housing 9, there being a longitudinal opening or bearing 12 through the bearing-block, said opening being substantially rectangular in cross-section. The clamping-screw 13 is slidingly mounted in this opening 12, said screw being of any desired polygonal form in cross-section and fiting in the opening, so as to hold the screw from rotation. A longitudinally-extending recess 14 is formed in the side of the screw 13, and a retaining-screw 15 is tapped through the side of the bearing with its point extending into the recess 14 to limit the endwise motion of the screw 13 in the bearing. A nut 16 is screw-seated upon the screw 13, the ends 17 and 18 of said nut being reduced to form spindles to fit rotatably in the bearings 19 and 20, and the ratchet-teeth 21 extend from the center of the nut between the bearings 19 and 20. Plates 22 and 23 extend from the bearings 19 and 20, and a screw 24 holds the plates and bearings together, said screw also serving as a pivot for the reversible pawl 25, mounted between the plates 22 and 23. A handle 26 extends upwardly from the plate 22, said handle having a spring-seat 27 bored from its lower end to receive the spring 28. A latch-head 29 is slidingly mounted upon the lower end of the bearing 27 against the spring, and a guide-pin 30 extends upwardly from the head into the spring 28. The lower end of the latch-head 29 has oppositely-beveled faces 31 and 32, and the upper side of the reversible pawl 25 has beveled faces 33 and 34. The edge 35 upon the lower end of the latch-head is parallel with the edge 36, extending upwardly from the reversible pawl 25, and said edges rub together and snap back and forth, so that when one end of the pawl is down in engagement with the teeth 21 the other end is up out of engagement. The end of the nut or the outer face of the bearing 19 engages against the inner end of the bearing-block 11. A vertical bearing-block 37 is mounted upon the inner end of the screw 13, the vertical opening 38 through said bearing-block being polygonal. The head 39 is slidingly mounted in the opening 38, there being a recess 40 in one side of the head to receive the tip of the stop-screw 41 to limit the up-and-down motion of the head, and teeth 42 extend downwardly from the head.

Assuming that is desired to lay the finished floor-boards 7 upon the rough floor 43, the base-plate 6 is placed upon the board 7, with the tongue 8 against the outer edge of the outer board, the operator stands upon the platform-board 10, hits the head 39 with a hammer to drive the teeth 42 into the rough floor, and then operates the handle 26 to press the lip against the board 7 and press the boards 7 tightly together, and then said boards are nailed.

The clamp may be used by a carpenter or cabinet-maker upon a work-bench, and it may be used in many other connections besides that illustrated. If the device is used by a carpenter upon a work-bench, for instance, the teeth 42 may be driven into a work-bench and the lip 8 placed against the work and the ratchet mechanism operated to tighten the work.

The essentials are: two points of rigid engagement, means of engaging the first rigid point, means of engaging the loose work, said loose work being against the second rigid point, and means of forcing the two points of engagement apart.

I claim—

1. In a clamp: a base adapted to engage the work; a platform attached to the base; bearing carried by the base; a screw slidingly mounted in the bearing upon the base; a nut on said screw, and the lever and ratchet for operating the nut.

2. In a clamp: a base adapted to engage the work; a bearing carried by the base; a screw slidingly mounted in the bearing and held against rotation; a vertical bearing carried by the screw; a head slidingly mounted in the bearing; having teeth to engage a rigid point; a nut upon the screw against the base-bearing; and means of operating the nut.

3. In a clamp: a base adapted to engage the work; a bearing carried by the base; a screw slidingly mounted in the bearing upon the base; a nut upon the screw against the base; teeth carried by the screw and means for adjusting and locking said teeth upon said screw; and means for operating the nut.

4. In a clamp: a base adapted to engage the work; a bearing carried by the base; a screw slidingly mounted in the bearing and held against rotation; a nut upon the screw against the base; a vertical bearing carried by the screw; a head slidingly mounted in the bearing; and means carried by the head for engaging a rigid point.

In testimony whereof I have signed my name to this specification in presence of two subscribing witnesses.

JOHN HERR.

Witnesses:
ALFRED A. EICKS,
EDWARD E. LONGAN.